Dec. 18, 1923. 1,477,827
L. E. HILDEBRAND ET AL
INSTRUMENT FOR TRANSMITTING ANGULAR MOVEMENT
Filed Dec. 1, 1921
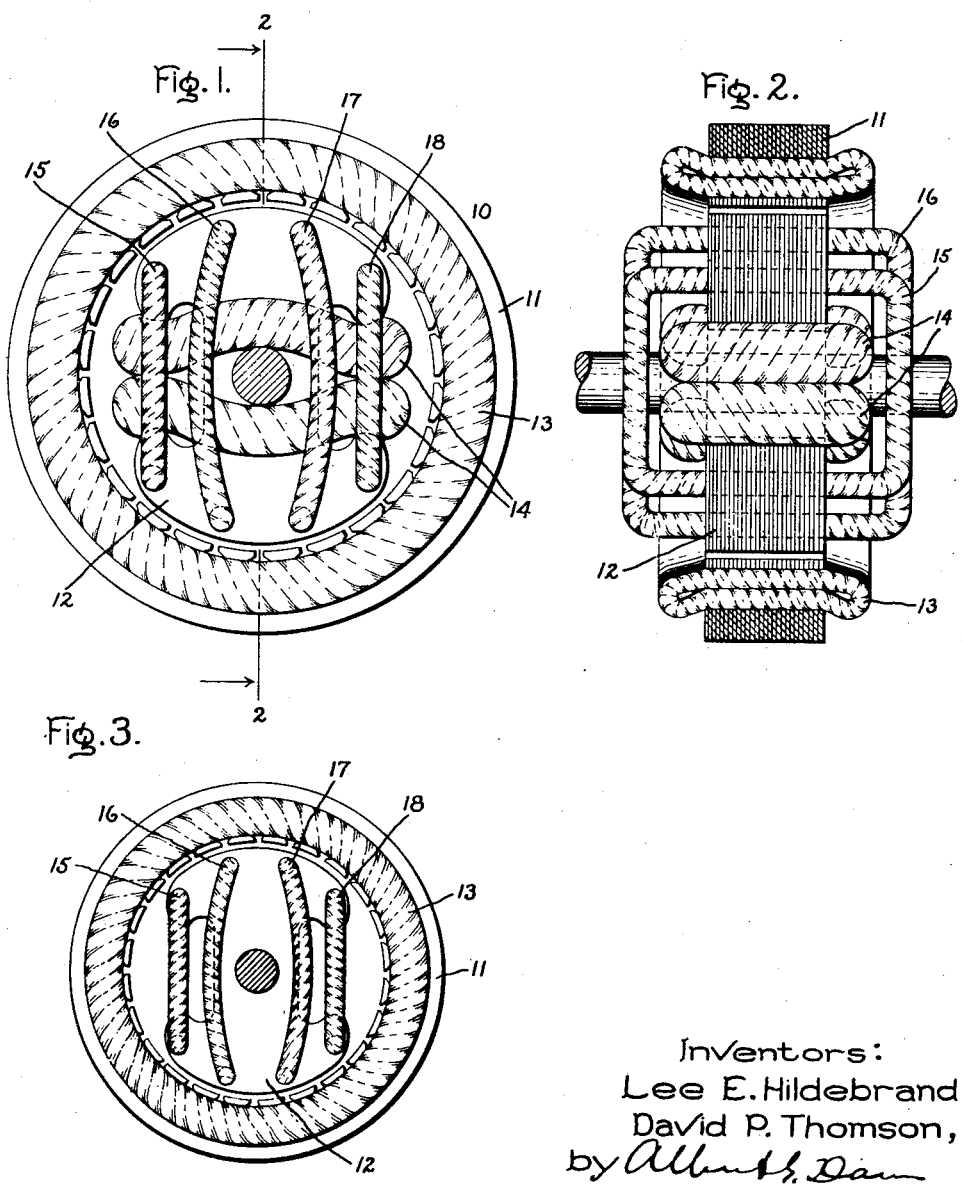
Inventors:
Lee E. Hildebrand,
David P. Thomson,
by
Their Attorney.

Patented Dec. 18, 1923.

1,477,827

UNITED STATES PATENT OFFICE.

LEE E. HILDEBRAND AND DAVID P. THOMSON, OF LYNN, MASSACHUSETTS, ASSIGNORS TO GENERAL ELECTRIC COMPANY, A CORPORATION OF NEW YORK.

INSTRUMENT FOR TRANSMITTING ANGULAR MOVEMENT.

Application filed December 1, 1921. Serial No. 519,160.

*To all whom it may concern:*

Be it known that we, LEE E. HILDEBRAND and DAVID P. THOMSON, citizens of the United States, residing at Lynn, county of Essex, State of Massachusetts, have invented certain new and useful Improvements in Instruments for Transmitting Angular Movement, of which the following is a specification.

This invention relates to instruments for transmitting angular movement and has for its object the provision of improvements in instruments of this character.

More specifically our invention relates to the self-synchronous instruments for the transmission of angular movement at a distance, now known as "selsyn" instruments. Such instruments comprise a poly-circuit armature winding with a single-phase field winding in inductive relation therewith. In the application of the instruments to the transmission of angular movement of an object, one of the instruments, called a generator, is operatively connected to the object. Another instrument, called a motor, has its armature winding connected to the armature winding of the first. The fields of the instruments are energized from a suitable source of alternating current supply and consequently induce voltages in their respective armature windings. These voltages normally counterbalance. Upon movement of the object, the generator windings are displaced which causes the voltages to become unbalanced. This results in a flow of equalizing currents which exert a torque on the rotatable element of the motor, causing it to reproduce the movement imparted to the generator.

The selsyn motor has a low torque, and in its use for driving various control apparatus, etc., this is a disadvantage. This torque, furthermore, decreases with the angle of lag of the motor so that when the motor approaches its position of angular agreement with the generator, its torque greatly diminishes. One of the reasons for this low torque is the armature reaction in the instrument. The angular lag of the motor increases with increased load until the torque exerted by the motor balances the torque of the load. Obviously, increased torque of the motor at small angular differences from its zero or stable position decreases the angular error of readings. Another inherent defect in instruments of this character is that if the motor is subjected to a quick movement by either the generator or the load on the motor, the motor is subjected to periodic oscillations of a period depending upon the torque of the motor and the moment of inertia of the rotating element. These oscillations make it difficult to observe the readings of the instrument. Furthermore, the oscillations may build up until the motor runs continuously as a synchronous or an induction motor.

In carrying out our invention, we have provided a short circuited conductor, forming a compensating winding, which in one form of our invention we mount on the rotor of the selsyn instrument at right angles with the field winding which is also carried by the rotor. The armature winding, in this form of our invention, is mounted on the stator. Obviously, however, the armature winding may be mounted on the rotor, in which case the field winding and compensating winding would be mounted on the stator. The compensating winding is not affected by the flux set up by the field winding since it is parallel with this flux, but it is interlinked by any flux set up by the armature at an angle with the field flux, and consequently acts to damp out such flux. Armature reaction is thus largely overcome, and the torque of the instrument consequently increased by reason of the resulting increased current flow. The torque is also increased by reason of the reaction between the compensating winding and the armature flux, following the well-known law that a closed coil in a magnetic field always tends to place itself in a plane parallel with that field. The compensating winding, also, produces a stabilizing effect on the motor and reduces the oscillations. The increased torque obtained by using the compensating windings causes what oscillations there may be to be of higher frequency. These higher frequency oscillations are more easily and quickly damped out by other suitable devices. The tendency of the instrument to run as a synchronous or as an induction motor is greatly decreased by the decreased tendency of the instrument to oscillate.

In a modified form of our invention, the field winding is omitted, in which case the instrument is actuated solely by the reactive effect on the compensating winding.

For a more complete understanding of our invention reference should be had to the accompanying drawing in which Fig. 1 is an elevation view of a selsyn instrument constructed in accordance with our invention; Fig. 2 is a view showing the stator element in section along the line 2—2 of Fig. 1, looking in the direction of the arrow, and Fig. 3 is an elevation view of a modified form of our invention.

Referring to Figs. 1 and 2 of the drawing, in one form of our invention the selsyn instrument 10 comprises an annular stator element 11 and a rotor element 12 supported on suitable bearings (not shown) so as to be rotatable within the stator. The rotor and stator elements are built up of laminated core iron. On the stator element is wound a poly-circuit bi-polar distributed winding 13 physically identical with a three-phase bi-polar induction motor winding, while on the rotor element is wound a field winding 14 which is supplied with alternating current. In the particular arrangement shown in the drawing field winding 14 is made in two sections.

The principal feature of our invention consists in providing one or more closed conductors on the rotor which conductors lie in a plane perpendicular to the field winding 14, that is, in a plane parallel with the direction of the magnetic flux set up by the field winding. In this form of our invention, we have shown a plurality of separate closed conductors 15, 16, 17 and 18, forming compensating windings, which are mounted symmetrically on the rotor in suitable holes passing therethrough in an axial direction. The closed windings embrace the field winding 14 and project across the ends of the stator. One or more closed windings may be used. The windings may each be formed of a single turn or a plurality of turns of a suitable electric conductor, depending upon the characteristics of the particular selsyn instrument to which they are applied. The ends of each winding are connected together so that each winding forms a short-circuited secondary for any flux which interlinks with it.

In the operation of a selsyn instrument equipped in accordance with our invention, it will be observed that the compensating windings are not interlinked by the field flux set up by winding 14 and hence are not affected thereby. Any cross flux set up by the armature at an angle with the field flux and tending to distort the field flux will, however, interlink one or more of the compensating windings and will be damped out by their inductive effect. Armature reaction in the instrument is thus greatly reduced and the resulting increased current flow causes an increase in torque. The torque of the instrument is increased also by reason of the reaction between the compensating windings and the main armature flux. It will be observed that when the rotor is lagging, the main flux of the armature is at an angle with the flux of the rotor field winding and will therefore interlink with the compensating windings. The compensating windings, acting as short-circuited secondaries of a transformer, will be acted upon in a direction to turn them in a plane parallel with the armature flux.

The stabilizing effect of the compensating windings is also of advantage in damping out periodic oscillations of the rotor. Such oscillations if of the proper period are accumulative in the rotor, and the rotor will be gradually brought up to such a speed that it will fall into step and operate continuously in one direction as a synchronous or as an induction motor. The effect of the compensating windings is to change the period of the oscillations so that they are more easily damped out.

As shown in Fig. 3, the main field winding 14 of the arrangement shown in Figs. 1 and 2 may be omitted in instruments where 180° ambiguity in readings can be tolerated. In such case the rotor 12 is actuated solely by the reactive effect on the short circuited windings 15, 16, 17 and 18. This arrangement is particularly adapted for selsyn motors, although an instrument of this character may be used as a generator. In any case, however, one of the instruments in a system, either the motor or the generator, must be provided with an exciting winding 14.

In accordance with the provisions of the patent statutes, we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States is:—

1. An instrument for transmitting angular movement comprising a stator member, a cooperating rotor member, poly-circuit armature and single-phase field windings for said members respectively, and a short-circuited electrical conductor at right angles with said field winding so as to be interlinked by magnetic flux at an angle with the field flux, said armature winding being adapted to be connected to the armature winding of a similar instrument, whereby when the rotor of the latter instrument is turned an auxiliary torque is produced by said short circuited conductor tending to turn its rotor into angular agreement therewith.

2. An instrument for transmitting angular movement comprising a stator member, a cooperating rotor member, bi-polar alternating current armature and field windings for said members, and a short circuited electrical conductor at right angles with said field winding so as to be interlinked by magnetic flux at an angle with the field flux, said armature winding being adapted to be connected to the armature winding of a similar instrument, whereby when the rotor of the latter instrument is turned an auxiliary torque is produced by said short circuited conductor tending to turn its rotor into angular agreement therewith.

3. An instrument for transmitting angular movement comprising a stator member provided with a polyphase armature winding, a rotor member provided with a single-phase field winding inductively cooperating with said armature winding, and a short-circuited conductor on said rotor member at right angles with said field winding, said armature winding being adapted to be connected to the armature of a similar instrument constituting a transmitter, whereby when the rotor of the transmitter is turned an auxiliary torque is produced by said short circuited conductor tending to turn its rotor into angular agreement with the rotor of the transmitter.

In witness whereof, we have hereunto set our hands this 29th day of November, 1921.

LEE E. HILDEBRAND.
DAVID P. THOMSON.